United States Patent Office 3,473,514
Patented Oct. 21, 1969

3,473,514
DEVICE FOR APPLYING LIQUID TO A POROUS PRODUCT
Sven Tore Anders Safholm, Drottningholm, Bengt Lennart Sundquist, Tyreso, and Jan Rolf Franksson, Nacka, Sweden, assignors to Aktiebolaget Casco, Stockholm, Sweden, a company of Sweden
Filed Sept. 24, 1965, Ser. No. 489,917
Claims priority, application Sweden, Sept. 24, 1964, 11,462/64
Int. Cl. B05c *3/18, 8/00*
U.S. Cl. 118—410　　　　　　　　　　　5 Claims

ABSTRACT OF THE DISCLOSURE

A rigid liquid impervious supporting surface is provided with a resilient deformable liquid impervious continuous frame means extending upwardly therefrom and sealed with respect thereto to define a space therewith. A liquid is disposed in the space, and a porous product is placed on the upper part of the frame means. This product is then moved toward the supporting surface to compress and deform the frame means thereby forcing liquid upwardly to penetrate the porous product.

---

Figure 1:
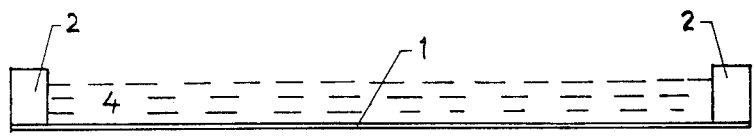

The present invention relates to a device for applying liquid to porous products for example in order to increase the moisture content or in order to impregnate said products with chemicals for various purposes.

It is known that products of wood and fibre board products, such as particle board or other products of cellulosic fiber material, produced under heat and pressure with the aid of binders, change their dimensions depending on the humidity of the atmosphere and water exposure. This circumstance involves great troubles at application and usage of said products and it is therefore of great importance to improve their dimensional stability.

Our investigations have revealed a method of improving the dimensional stability of preferably particle boards (see our U.S. Patent No. 3,164,648). After pressing the boards are given a moisture content of at least 20% in order to decompress the particles of the board. Then the product is dried to a moisture content of 6–20%. By this after-treatment the maximum dimensional change at various climatic conditions is reduced by 60 to 70% compared to untreated boards. The volume weight is reduced as well, while the mechanical strength of the board remains substantially the same.

When treating particle boards or hardboard of good quality in water by soaking same for 24 hours the water absorption as a rule ranges from 10 to 40 percent. For special qualities of board containing no water repellent agent, the soaking time can be reduced to 2 hours. When impregnating with solutions for protection against e.g. fire, rot, fungus, insect ravages and termite attacks generally so much solution has to be applied that the soaking time even for said special boards has to be prolonged beyond two hours.

The accelerated impregnation and moisturing methods known imply generally some kind of pressure impregnation. One-way pressure impregnation offers great advantages particularly because no entrapped air occurs in the inner layers of the board since the air can evacuate at the opposite side. However, it was difficult to find a simple and reliable device for carrying out the one-way pressure impregnation. As a rule the liquid was pressed into the board by means of compressed air or by means of some type of liquid pump but these devices were rather complicated. It was suggested moreover to apply the liquid by pressing the boards between one or several pairs of rollers, the surface of one of the rollers being covered with some elastic material such as rubber, said surface being provided with holes for the uptake of liquid from dipping containers arranged below the rollers and for pressing the liquid into the boards. The disadvantage of this method is that only a limited amount of liquid can be applied at each pressing operation wherefore in most cases several pairs of rollers have to be employed, which makes the investment costs considerable. It also has been suggested to spray water on the surface of the boards and feeding the boards over suction boxes in order to accelerate the penetration. To obtain more even distribution of the liquid on the upper surface of the boards it was suggested to use a wetted felt.

The characteristic feature of the present invention is that the porous product is pressed against a frame of an elastic material e.g. rubber, being joined to a tight bottom and charged with the liquid. The liquid is forced to penetrate the porous product due to the decrease of the volume of the frame-container caused by deformation (compression) of the elastic frame. At pressing which may be carried out for example in a hydraulic press, the pressure applied shall be sufficient to compress the elastic frame to such an extent that the required amount of liquid is forced to penetrate the porous product and the excess liquid, if any, leaves from the upper surface of the product. After the pressing operations the frame-container is recharged with liquid. To enhance the moisture content from 6% to 30–100% in a particle board having a volume weight of 650 kg./m.$^3$ a water quantity of 150–575 l./m.$^3$ is required, which for a 20 mm. board corresponds with 3–11.5 l./m.$^2$. Said water quantities can easily and rapidly be applied in one single pressing operation when employing the elastic frame-container according to the invention. The elastic frame even renders good tightening towards the board surface.

The elastic frame and/or the bottom plate can be provided with one or several holes for connection with one or several lines for liquid supply. In the line there may be arranged a means for adjusting of the liquid pressure. The upper part of the elastic frame can be preformed with a narrow, easily compressable elevated rim in order to simplify the charging and to avoid overflow. In order to facilitate the evacuation of air and excess liquid a slotted plate, a wire screen or the like may be arranged between the porous product and the upper press platen.

Due to the vacuum at decompression of the frame it may happen that the board adheres and might become difficult to separate from the frame. To facilitate removing of the board, liquid can be supplied via the feed line.

When the one-way pressure impregnation is completed liquid may be sprayed on the upper surface of the product in order to give the surface a higher moisture content especially when small amounts of impregnation liquid were used, to avoid tensions in the board by uneven moisture distribution immediately after the pressing operation.

According to the present invention it is possible e.g. to treat particle board of wood by means of one-way pressure impregnation during 10–60 seconds while earlier by water soaking the same board had to be treated at least for 2 hours. The moisture penetration of hot boards from the pressing and curing operation obviously will be quicker and the after-drying as well. Wood particle boards containing phenolic binders preferably are after-cured for example 20 minutes at 150° C. The board can be directly transferred from the after-curing to the impregnation step and the water absorption and drying will be shortened. Even other products than said particle board can be treated according to the above method e.g. concrete products, gypsum board, pottery, mineral fiber boards, boards with reinforced resin binders, fiberboards in general and particle boards of flax shives, bagasse, etc.

The method of the invention will be illustrated in more detail in the accompanying drawing and the following examples.

Figure 2:
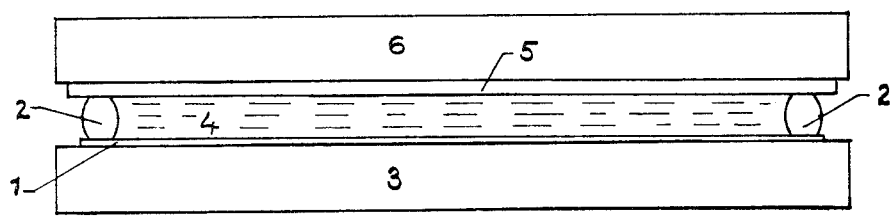
Figure 3:
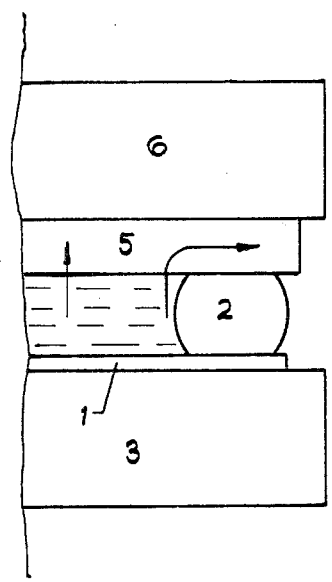
Figure 4:
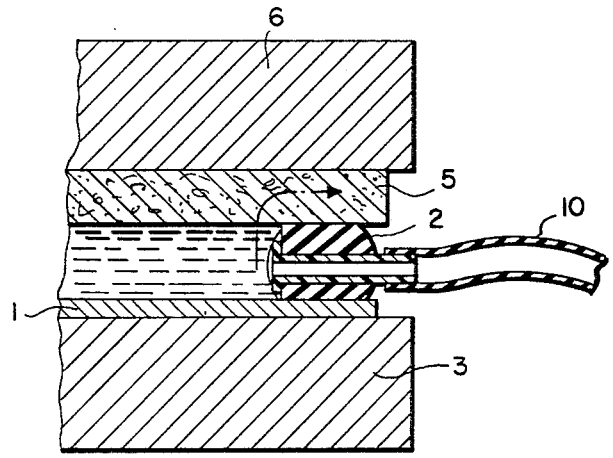
Figure 5:
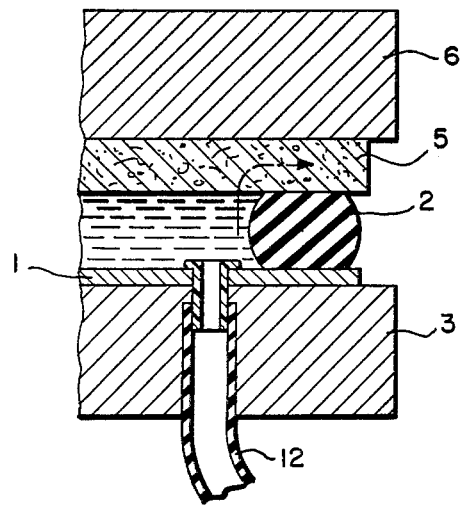

In the drawing:

FIGURE 1 shows a cross-section of the elastic frame 2 joined to a bottom plate 1, FIGURE 2 shows the elastic frame 2 and the bottom plate 1 loaded on the lower platen 3 of a press which frame-container is filled with liquid 4, a board product 5 placed on the frame 2 and the upper platen 6 of a press pressed down causing a certain deformation of the frame 2, FIGURE 3 shows in a larger scale a partial view of FIGURE 2 indicating the liquid penetration through the board and through the edge between the upper platen 6 and the elastic frame 2, FIGURE 4 is a view similar to FIGURE 3 showing a modified form of the invention wherein a line 10 connected with a suitable source of liquid is provided for charging liquid through a hole in the frame 2, and FIGURE 5 is a view similar to FIGURE 3 of still another modification wherein a line 12 connected with a suitable source of liquid is provided for charging liquid through a hole formed in bottom plate 1.

Example I

Around the border of a 1 mm. aluminum plate of 1000 x 2000 mm. a continuous rubber frame of the cross-section 50 x 50 mm. (Rubber Quality 193, Hardness 40°±5° Shore) was bonded by a contact adhesive. This frame-container was placed on the lower platen of a hydraulic press, then filled with water and a particle board of corresponding dimensions was introduced thereupon. The particle board was manufactured with a phenolic binder and cured for 10 minutes at 180° C., volume weight 0.675, thickness 15 mm. and moisture content 6%. The press was closed for 30 seconds with a pressure of 3 kp./cm.$^2$ and the rubber frame was compressed to about 44 mm. height. Water penetrated the board to its upper surface and entrapped air easily escaped between the upper surface and the upper press platen. The solution uptake corresponded an increase in the moisture content to 60%. The press was opened, the board removed and dried first in open air for 24 hours and then in a dry-shrank at 120° C. for 5 hours. The moisture content was 10%. The treated board showed a maximum swelling of about 10% after storing in water for 5 days (test method DIN 52360–52365, specimen size 25 x 25 mm.) compared with 25% for untreated board.

Example II

A 15 mm. wood particle board with a melamine resin binder, pressed for 10 minutes at 150° C., volume weight 0.650, moisture content 6%, was treated in the manner described in Example I. A pressure of 2 kp./cm.$^2$ was applied for 15 seconds and the rubber frame was compressed to a height of 46 mm. The solution uptake corresponded to an increase in the moisture content to 32%. The board was stored 2 hours and placed in a dry-shrank for 3 hours at 100° C. whereupon the moisture content was 10%. After testing the maximum swelling was about 10% compared with about 25% for an untreated board.

Example III

A 22 mm. wood particle board with a phenolic resin binder and pressed for 15 minutes at 180° C., volume weight 0.650, moisture content 6%, was treated in the same manner as described in Example I with a 3% aqueous solution of sodium chlorophenolate (Santobrite). A pressure of 4 kp./cm.$^2$ was applied for 45 seconds and the rubber frame was compressed to about 40 mm. height. The solution uptake corresponded an increase in the moisture content to 70%. The board then was dried in open air to a moisture content of about 40% and thereupon in a dry-shrank to a moisture content of about 10%. The chlorophenolate content of the treated board was 1.5% being sufficient for protection against termite attacks.

EXAMPLE IV

A 6 mm. hardboard prepared according to the Masonite process, volume weight 0.700 and moisture content of 2%, was treated in the manner as described in Example I with 1.5% aqueous solution of sodium chlorophenolate. A pressure of 3 kp./cm.$^2$ was applied for 10 seconds and the elastic frame was compressed to about a height of 46 mm. The water uptake corresponded an increase in the moisture content to 60%. The board was dried in a dry-shrank at 100° C. to a moisture content of 10%. The chlorophenolate content of the treated board was 1.5%.

The following advantages are achieved when using the apparatus of the present invention:

(1) One-way pressure impregnation with simple equipment
(2) Low operation costs (no compression air and no heavy fluid pumps are required)
(3) Efficient tightening against the board products due to even pressure distribution by the elastic frame
(4) Rapid and efficient production.

We claim:

1. Apparatus for applying liquid to a porous product such as particle board and hardboard comprising a rigid and liquid impervious supporting surface, a resilient deformable liquid impervious continuous frame means extending upwardly from said supporting surface and defining a liquid receiving space therewith, said frame means being bonded to the upper face of said supporting surface to provide a liquid seal therewith, said space receiving a body of liquid, and the upper surface of said frame means being adapted to support a porous product whereby when the porous product is moved toward said supporting surface, the frame means is compressed and deformed to reduce the volume of said space and force liquid upwardly to penetrate such porous product.

2. Apparatus as defined in claim 1 wherein said frame means is formed of rubber, and said supporting surface comprises a metallic plate.

3. Apparatus as defined in claim 1 including at least one hole in said frame means for feeding liquid into said space.

4. Apparatus as defined in claim 1 including at least one hole in said support surface for feeding liquid into said space.

5. Apparatus as defined in claim 1 including a relatively rigid foraminous means adapted to be supported on the upper surface of a porous product for evacuation of gases and excess liquid from the porous product.

References Cited

UNITED STATES PATENTS 1,858,111  5/1932  Rees _____ 118—50
2,032,027  2/1936  Rees _____ 117—120

ALFRED L. LEAVITT, Primary Examiner

J. A. BELL, Assistant Examiner

U.S. Cl. X.R.

117—120, 113; 118—50, 415; 100—73